March 7, 1939.  W. P. MORTON  2,149,537
APPARATUS FOR PRODUCING BISCUITS
Original Filed May 26, 1936
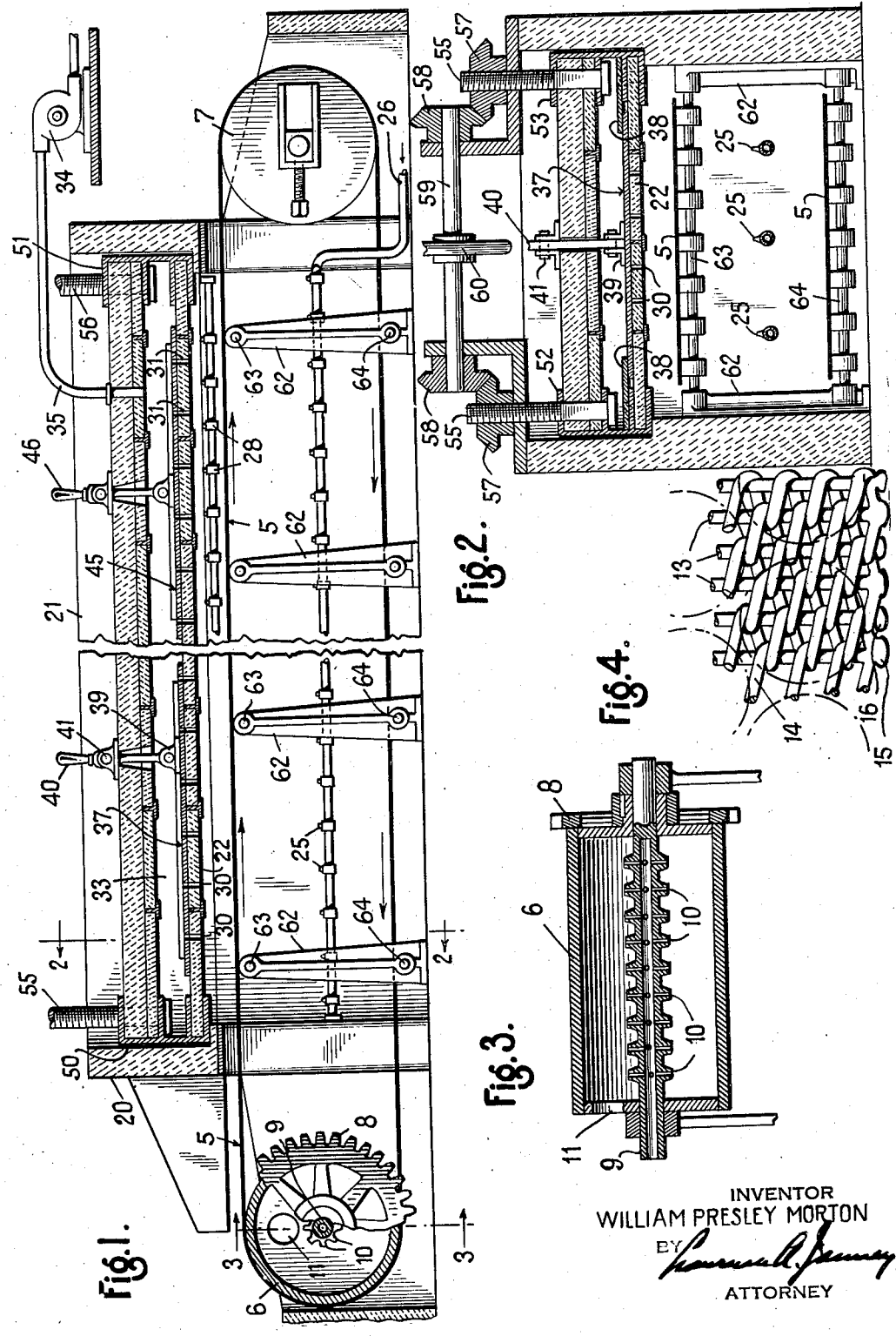
INVENTOR
WILLIAM PRESLEY MORTON
ATTORNEY Patented Mar. 7, 1939

2,149,537

UNITED STATES PATENT OFFICE 2,149,537

APPARATUS FOR PRODUCING BISCUITS

William Presley Morton, Indianapolis, Ind.

Application May 26, 1936, Serial No. 81,836
Renewed September 27, 1938

6 Claims. (Cl. 107—57)

This invention relates to apparatus for the production of biscuit and the like, and pertains particularly to the baking operations. The invention is applicable with especial value in the baking of dough which requires a quick initial "spring", i. e. a sudden expansion of leavening gases and vaporization of moisture at the outset of the baking, as in those "sponge" doughs for soda crackers and the like.

Among other objects, the invention is intended to provide means for the superior application of heat to the dough, to suit varying kinds and conditions, and particularly to insure the quick initial "spring" in doughs that need it; and also to provide for the disposal of moisture at desired stages and in proper degrees in the baking process.

An illustrative form of apparatus is shown in the accompanying drawing, in which Fig. 1 is a diagrammatic side elevation of the major features of the apparatus;

Fig. 2 is a vertical section on the line 2—2 of Fig. 1;

Fig. 3 is a detached vertical section on the line 3—3 of Fig. 1;

Fig. 4 is a plan view of a fragment of an illustrative form of perforate conveyor belt usable in the apparatus and method indicated in Fig. 1.

The drawing shows an illustrative oven structure through which passes an endless conveyor 5 of special construction presently described. The conveyor is mounted upon a driven drum 6 and a second drum 7 at the opposite extremity of the oven. The drum 6 has fixed thereon a gear 8 to which is applied the drive, from any suitable source of power, for causing the conveyor to travel in the direction indicated by the arrows. The drum 6 and its gear 8 rotate upon a hollow shaft 9, through which heat is communicated to the interior of the drum 6 to maintain it at desired temperature, and thereby to aid in keeping the conveyor at the temperatures desired, as presently explained. For example, the hollow shaft 9 may be connected with a source of fuel which may pass through the jets 10, and may be ignited through the aperture 11 in one end of the drum. A regulating cock (not shown) will be provided in the fuel conduit so that the heat in the interior of the drum 6 may be governed to maintain proper temperature and to vary it to suit different requirements.

The conveyor 5 is of distinctive character, formed of metal, or a composite of metal pieces, preferably combining two important characteristics, namely: that it shall constitute a relatively heavy heat-retaining body of metal, and that it shall be equipped with a multitude of air passages extending through it. One desirable form of the conveyor 5 is composed of metal, steel for example, of such structure and dimensions that a section of the conveyor having an area of 1 sq. ft. weighs approximately 5 to 8 lbs., or even more. An appropriate type of conveyor is indicated by the fragmentary plan view in Fig. 4, in which are shown the transverse bars 13 which extend across the width of the conveyor, interconnected by coiled bars 14 resembling somewhat, in mechanical principle, the sort of conveyor belt shown in Fig. 1 of the patent to Edgar Pattee No. 1,204,816 dated November 14, 1916. The edge of the conveyor may be formed by spot-welding together the extremities of the coiled bars 14 and the transverse bars 13 as indicated at 15, and the alternating bars 13 may be headed as indicated at 16. The cross sections of the bars 13 and 14, the dimensions and pitches of the coils, and the coordination of the transverse and coiled bars, are such that, as already said, the conveyor having a receiving area a foot square weighs approximately 5 to 8 lbs. or more. At the same time, the interstices between the bars supply a multitude of air passages through the conveyor.

For reasons later explained, in some aspects of the invention it is preferred that the biscuit or the like deposited upon the conveyor be in separate pieces, for the respective biscuit, with edges spaced apart sufficiently to permit free circulation of heat uniformly around the periphery of each biscuit and between contiguous biscuits. In Fig. 4 the dot and dash circles, respectively, indicate individual biscuit as they may be deposited on the conveyor, spaced apart so that currents of hot air passing through the interstices of the conveyor may completely encircle each biscuit with substantial uniformity. The bars 14 may be of any desired cross section, and the convolutions of their coils may have more or less curvature with the result that the supporting surface of the conveyor is composed of numerous small separated surfaces against which the biscuit have contact along rather narrow lines or at individual points. The specific bars 14 of Fig. 4 are circular in cross section, which is one desirable form. When the biscuit are thus supported upon the irregular surface of the conveyor, each biscuit being positioned over and substantially encircled by interstices in the conveyor, there is opportunity for the direct application of heat through the interstices of the conveyor to the under surface of each biscuit, and also for the relatively free circulation of heat across the whole under surface of each biscuit and around its edges.

The illustrative form of oven structure comprises the walls 20, 21 surrounding the oven chamber, through which passes the conveyor 5, the ceiling of the chamber being supplied by a more or less horizontal wall 22 formed of slabs of firebrick or the like. In the lower part of the chamber are the burners 25, 25 which illustrate any practicable source of heat for creating and maintaining desired temperatures in the chamber. For example, the burners 25 may be supplied with fluid fuel through the pipe 26. Additional burners 28 may be located between the conveyor 5 and the ceiling 22. In some instances it is preferable to supply these burners 28 in the vicinity of the discharge end of the oven so that the heat from them may contribute to the later stages of the baking of the biscuit.

In baking some kinds of biscuit, considerable moisture is driven off from the dough in the form of steam. The steam emerges from both the top and under surfaces of the dough. When the dough rests upon an imperforate hot plate or conveyor, the steam at the under surface of the dough is likely to be trapped between it and the plate and to form concavities in the dough, largely because there is no adequate opportunity for the steam to escape. The result is that the under face of the baked dough is pitted by irregular pockets, frequently of considerable size, and the dough is unevenly baked and browned on its lower surface partly because the trapped moisture somewhat insulates the dough from the heat of the plate. These defects in method and product are avoided or minimized in practicing the present invention because the steam can readily escape from beneath the dough through the passages formed by the irregular surface of the conveyor, and also because the perforations or interstices in the conveyor serve as miniature chimneys for currents of hot air or gases which may impinge against the under surface of the dough, flow through the described passages and carry away the steam, instead of leaving it trapped beneath the dough. The substantial heat-retaining capacity of the relatively heavy metal in the conveyor enhances these beneficial effects by maintaining a substantial heat supply adjacent the dough to aid in maintaining the currents to carry away steam.

It has been a familiar practice in the prior art to form docker holes passing through the dough, to aid in the escape of steam which otherwise would be trapped under the dough; but these docker holes alone do not adequately avoid this trapping of steam beneath the dough or the resulting defects in the baking and the product. When docker holes are employed in the use of this invention, there is a direct cooperation between the docker holes and the perforations or interstices in the conveyor, such that the former function as continuations of the miniature chimneys through the conveyor facilitating the flow of the described currents of hot air or gases and the carrying away of the steam.

When an imperforate oven plate or band is employed, the air and moisture above it has a tendency to be more or less inert and to become stratified in layers of different respective temperatures, with the result that excess moisture or steam may be present at the upper surface of the dough and may cause an objectionable glaze or crust on the top surface which interferes with proper drying and baking. But in the use of a heavy heat-retaining conveyor having numerous perforations or interstices, the induced currents or draughts at and across the under surface of the dough, and around individual dough-biscuit when they are segregated, and through docker holes when they are employed, help to carry away the moisture or steam from the vicinity of the top surface of the dough and to break up the tendency of the air to stratify.

In some instances, it is desirable to withdraw moisture more or less from the oven chamber. For this purpose, the ceiling 22 is provided with a number of vents 30, 30 near the entrance end of the chamber, and also with numerous vents 31, 31 toward the discharge end of the chamber. These vents lead through the ceiling 22 into one or more auxiliary chambers 33 connected with an exhaust pump 34 through a pipe coupling 35. The effect of the exhaust pump is to draw air and moisture out of the auxiliary chamber 33, and through the vents 30, 30 and 31, 31 from the main oven chamber. For regulating the vents 30, to close them entirely or to open them to the maximum or to vary their effective cross sections, a valve plate 37, having apertures corresponding to the vents 30, 30, is mounted upon the top surface of the ceiling 22 and is arranged to slide (right and left in Fig. 1) to close, open or regulate the vents 30, 30. As shown in Fig. 2, the valve plate 37 slides beneath keepers 38 mounted on the ceiling structure, and is equipped with ears 39 for the attachment of the lower end of an adjusting handle 40 pivoted at 41 above the top wall of the ceiling structure. The passage through that top wall for the depending stem of the adjusting handle 40. supplies limiting stops for the extremities of adjustment of the valve plate 37. For regulating the second series of vents 31, 31, a separate valve plate 45 may be provided, to be adjusted by a handle 46. With this arrangement, suction vents at different locations in the oven may be separately regulated to suit different conditions. For illustration, in some instances it may be desirable to have the vents toward the entrance end of the oven widely or largely opened, while those toward the discharge end of the oven are restricted or entirely closed. Or the reverse may be called for under some circumstances. Or it may be desirable to have all the vents, in the plurality of groups thereof, similarly opened or entirely closed. Besides performing the functions just described, the arrangement of the ceiling vents under the influence of the suction pump 34 may be utilized to cause a flow of hot air, or air and moisture, in one direction or another relative to the movement of the conveyor 5. For example, if the vents 30 be wide open and the vents 31 be completely closed, the operation of the suction pump 34 may be regulated so as to create a considerable flow of heated air upwardly, through the vents 30, and while this would draw air and moisture from the vicinity of the entrance end of the oven, it would also create a current through the chamber in a direction generally opposite to that in which the upper run of the conveyor is traveling. A similar effect, but creating a current in the same direction as that of the travel of the conveyor, could be produced by closing the vents 30 and opening the vents 31.

A material part of the baking function is performed by heat reflected or radiated from the lower surface of the ceiling 22 to the top surfaces of the biscuit on the conveyor 5. To permit variation of this baking factor, the ceiling 22 is made adjustable toward and from the conveyor 5. For this purpose, the entire ceiling structure, comprising the immediate ceiling 22, the chamber 33, and the top wall, are mounted as a unit in channels 50, 51, 52, 53; and this integrated structure is provided with adjusting screws 55, 55 and 56, 56, the lower ends of which are headed inside the chamber 33. Thence the screws pass upwardly through the top wall of the structure in which the screws are squared in cross section and fitted into square holes in the top wall, to prevent rotation of the screws. Thence the screws extend upwardly through part of the framework of the apparatus to receive adjusting nuts 56, 56. The latter are formed with bevel gears to engage mating gears 58, 58 fixed at opposite ends of a shaft 59 which carries a hand wheel 60. One of the screws 55 has a right-hand thread and the other a left-hand thread. Upon turning the hand wheel 60 the adjusting nuts 57, 57 are rotated to elevate or lower the ceiling structure, thereby to regulate the distance between the conveyor 5 and the reflecting or radiating surface of the ceiling 22.

At intervals along the length of the conveyor 5 brackets 62, 62 are provided, in pairs arranged transversely of the oven chamber, one pair being shown in Fig. 2. Between the brackets 62, 62 there shown, as between the other corresponding brackets, shafts 63, 64 are mounted which carry idle rollers to support the upper and lower runs of the conveyor.

In the practice of the method and the use of the apparatus illustrated in the foregoing description, numerous important purposes are achieved. The relatively heavy concentration of metal in the conveyor 5 supplies a desirable heat-retaining capacity so that when the conveyor is heated to the desired degree, prior to the introduction of the comparatively cold dough biscuit, the content of heat in the metal suffices efficiently to give to the dough the desired quick "spring", i. e., the expansion of the leavening gases and the vaporization of a considerable part of the moisture in the dough. If a substantially lesser body of metal were employed, its heat content would be too quickly and ununiformly dissipated upon contact with the colder dough pieces, with the result that the application of heat to the dough would not be sufficiently uniform or continuous to produce the desired "spring".

By the use of a conveyor structure such as that typified in Fig. 4, and characterized by the described concentration of metal, the initial quick "spring" of the dough is promoted not only by the high heat content of the metal which is communicated to the dough mainly by conduction and radiation, but also by convection currents originating at the burners 25 and passing through the interstices of the conveyor to impinge against the bottom surfaces of the dough, and to encircle each dough piece when the pieces are spaced apart on the conveyor, and additionally by direct radiation from the burners 25 also through the interstices in the conveyor to the bottom surface of the dough and around the edges of the dough pieces. In the baking of some kinds of dough, a critical time in the operation arrives when the cold dough is first deposited upon the conveyor. According to this invention, at that critical time the three modes of heat communication are brought to bear with the highest efficiency; i. e., conduction, convection and radiation. At the same time, because of the meshed structure of the conveyor, a very large aggregate surface of the metal is brought into play, and this serves the two-fold purpose that the heat content of the conveyor is speedily replenished against the tendency of the cold dough to consume the heat, and also the multiple surfaces of the metal radiate heat and initiate convection currents immediately adjacent the dough. In this way, there is an important practical coordination of the meshed conformation of the conveyor which exposes multiplied areas of metal, the very substantial body of metal of which the conveyor is composed, and the functioning of the interstices which contribute largely to the result.

A further contribution derives from the heating of the drum 6, which may maintain the heat content of the conveyor when it is more or less exposed at the entrance end of the oven, so that at the critical time of the deposit of the dough the proper temperature of the conveyor may be insured.

Another factor is the radiation and reflection of heat downwardly from the ceiling 22, and the facility with which moisture may be withdrawn and its withdrawal regulated at different points in the oven through the vents 30, 30 and 31, 31 controlled by the valve plates 37 and 45.

It has been recognized in the prior art that substantial bodies of heat-retaining metal are desirable to be used in oven plates and the like, to promote the quick initial "spring" of some kinds of biscuit dough. But mechanical limitations surrounding the use of endless conveyors of the steel-band type, have obstructed the use of band-metal thick enough to supply an adequate heat-retaining character. For example, when an endless steel band is used as an oven conveyor, it must travel around the drums whose diameters must be appropriate to the thickness of the band. It is a generally accepted rule that an endless steel conveyor can be driven practicably over drums having diameters approximately 1000 times the thickness of the band. Considerations of space and arrangement prohibit the use of drums of too great diameter. On the other hand, it has been generally considered that metal oven plates (for soda crackers, for instance) should be of about 10 gauge thickness,—i. e., about .14 inch thick, to have the needed heat-retaining capacity. If it were attempted to use this thickness of metal in an endless band, the latter would require drums having diameters of about 140 inches or more than 11 feet, which would be prohibitive. According to this invention, however, an adequately heavy body of metal in meshed or equivalent articulated form has an abundant heat-retaining capacity in an endless band conveyor, and at the same time has such free flexibility as to permit the use of drums of relatively small diameter. If drums of like diameter were to be used with a solid steel band, the band would have to be relatively thin with a consequent reduction of its heat-retaining capacity to such an extent that the desired initial "spring" could not be produced in some kinds of dough.

As will be evident to those skilled in the art, the illustrative apparatus and method may be modified in numerous particulars, and the features of invention may be employed in various sequences, combinations and subcombinations, within the scope of the appended claims. Some of the features are especially useful in baking segregated dough-biscuit but the invention may be used with great advantage in baking peels or sheets of dough.

I claim:

1. Apparatus for baking biscuit comprising, in combination, a band-oven chamber; a traveling oven-band for supporting dough in said chamber, said band formed of flexibly articulated meshes of heavy metal wire weighing approximately 5 to 8 pounds per square foot of the band, whereby the metal of the band at baking temperature has a thermal capacity sufficient to produce quick spring in dough, and said band having a multitude of interstices through the meshed wire interrupting the dough-supporting surface of the band and exposing a substantial proportion of the lower face of the dough; a source of heat for heating said band and supplying heat through said interstices to the exposed parts of the lower dough surface; means supporting the band for travel in the open chamber; and means for moving the band.

2. Apparatus for baking biscuit comprising, in combination, an oven chamber; a dough-support for said chamber formed of metal having a thermal capacity, per unit of area, approximating that of a steel oven plate of about 10 U. S. gauge, whereby the support at baking temperature supplies heat continuously to the dough by conduction and said support having interstices passing therethrough interrupting the dough-supporting surface and exposing a substantial proportion of the lower face of the dough; and a source of heat for heating the support.

3. Apparatus for baking biscuit comprising, in combination, an oven chamber; a dough-support for said chamber formed of metal having a thermal capacity approximately equivalent to that of steel mesh weighing about 5 pounds or more per square foot, whereby to produce quick spring in dough for soda crackers and the like, and said support having interstices passing therethrough interrupting the dough-supporting surface and exposing a substantial proportion of the lower face of the dough; and a source of heat for heating the support.

4. Apparatus for baking biscuit comprising, in combination, an oven chamber; a dough-support in said chamber formed of metal having a thermal capacity approximately equivalent to that of steel mesh weighing about 5 pounds or more per square foot, and said support having an interrupted dough-supporting surface supplying passages for the escape of moisture from the lower face of the dough; and a source of heat for heating the support.

5. Apparatus for baking biscuit comprising, in combination, an oven chamber; a dough-support in said chamber formed of metal having a thermal capacity approximately equivalent to that of steel mesh weighing about 5 pounds or more per square foot, and said support having an interrupted dough-supporting surface supplying passages for the escape of moisture from the lower face of the dough; a source of heat for heating the support; means to permit the removal of moisture from the oven chamber; and means to vary the direction of movement of moisture in the oven chamber.

6. Apparatus for baking biscuit comprising, in combination, an oven chamber; a dough-support in said chamber formed of metal having a thermal capacity approximately equivalent to that of steel mesh weighing about 5 pounds or more per square foot, and said support having an interrupted dough-supporting surface supplying passages for the escape of moisture from the lower face of the dough; a source of heat for heating the support; and means for regulating the volume of the interior of the chamber.

WILLIAM PRESLEY MORTON.